United States Patent
Tamburello et al.

(10) Patent No.: US 9,957,103 B2
(45) Date of Patent: *May 1, 2018

(54) HEAT TRANSFER UNIT AND METHOD FOR PREFABRICATED VESSEL

(71) Applicant: Savannah River Nuclear Solutions, LLC, Aiken, SC (US)

(72) Inventors: David A. Tamburello, Aiken, SC (US); Anthony J. McWilliams, Aiken, SC (US); Bruce J. Hardy, Graniteville, SC (US); Matthew R. Kesterson, Lexington, SC (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 180 days.

This patent is subject to a terminal disclaimer.

(21) Appl. No.: 14/947,239

(22) Filed: Nov. 20, 2015

(65) Prior Publication Data
US 2016/0075508 A1    Mar. 17, 2016

Related U.S. Application Data

(63) Continuation-in-part of application No. 14/104,681, filed on Dec. 12, 2013, now Pat. No. 9,809,380.

(51) Int. Cl.
*B65D 88/74* (2006.01)
*F17C 13/00* (2006.01)
*F28F 13/12* (2006.01)

(52) U.S. Cl.
CPC ......... *B65D 88/744* (2013.01); *B65D 88/748* (2013.01); *F17C 13/00* (2013.01);
(Continued)

(58) Field of Classification Search
CPC ... F17C 2227/0379; F17C 13/00; F28F 13/12; F28F 2255/02; F28F 2275/20; F28F 2280/02; B65D 88/744
(Continued)

(56) References Cited

U.S. PATENT DOCUMENTS 3,286,078 A   11/1966 Hynes
3,519,795 A   7/1970 Kinney
(Continued)

FOREIGN PATENT DOCUMENTS

| DE | 273496 | * 11/1989 | ............... F28D 7/08 |
| FR | 2918742 A1 | * 1/2009 | ............... F28D 7/10 |
| GB | 2377746 | 1/2003 | |

OTHER PUBLICATIONS

English translation of FR2918742 A1.*
English translation of DD273496.*

*Primary Examiner* — Jianying Atkisson
*Assistant Examiner* — Joel Attey
(74) *Attorney, Agent, or Firm* — Dority & Manning, P.A.

(57) ABSTRACT

Vessel assemblies, heat transfer units for prefabricated vessels, and methods for heat transfer prefabricated vessel are provided. A heat transfer unit includes a central rod, and a plurality of peripheral rods surrounding the central rod and connected to the central rod. The plurality of peripheral rods are movable between a first collapsed position and a second bowed position, wherein in the second bowed position a midpoint of each of the plurality of peripheral rods is spaced from the central rod relative to in the first position. The heat transfer unit further includes a heat transfer element connected to one of the plurality of peripheral rods.

20 Claims, 11 Drawing Sheets

(52) U.S. Cl.
CPC .... *F17C 2209/22* (2013.01); *F17C 2221/012* (2013.01); *F17C 2227/0309* (2013.01); *F17C 2227/0341* (2013.01); *F17C 2227/0379* (2013.01); *F17C 2270/0178* (2013.01); *F17C 2270/05* (2013.01); *F28F 13/12* (2013.01); *F28F 2255/02* (2013.01); *F28F 2275/20* (2013.01); *F28F 2280/02* (2013.01); *Y02E 60/321* (2013.01); *Y10T 29/4935* (2015.01)

(58) Field of Classification Search
USPC ........ 165/53, 74, 75, 76, 77, 82, 84, 86, 92, 165/120
See application file for complete search history.

(56) References Cited

U.S. PATENT DOCUMENTS

| | | | |
|---|---|---|---|
| 4,835,366 A | | 5/1989 | Owen et al. |
| 5,357,758 A | | 10/1994 | Andonian |
| 5,584,264 A | * | 12/1996 | Moyer ................ F22B 37/146 122/235.11 |
| 6,378,605 B1 | * | 4/2002 | Kutscher ................ F28B 1/06 165/181 |
| 6,516,142 B2 | | 2/2003 | Grant et al. |
| 7,681,604 B2 | | 3/2010 | Handa |
| 8,139,931 B1 | | 3/2012 | Griffin |
| 2003/0026604 A1 | | 2/2003 | Hollyday et al. |
| 2008/0047498 A1 | | 2/2008 | Hollyday et al. |
| 2008/0105691 A1 | | 5/2008 | Schlag |
| 2009/0159258 A1 | | 6/2009 | Handa |
| 2010/0220984 A1 | | 9/2010 | Potier et al. |
| 2010/0239236 A1 | | 9/2010 | Anliker |
| 2011/0155742 A1 | | 6/2011 | Garcia-Lorenzana et al. |
| 2011/0247354 A1 | * | 10/2011 | Asai ..................... F24F 5/0046 62/324.6 |

* cited by examiner

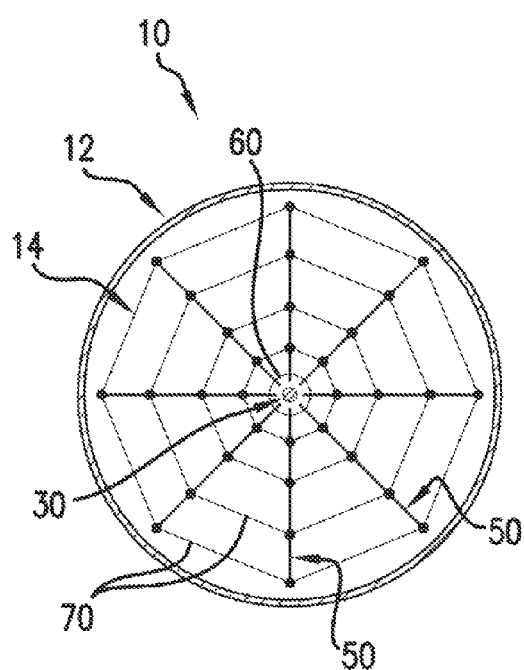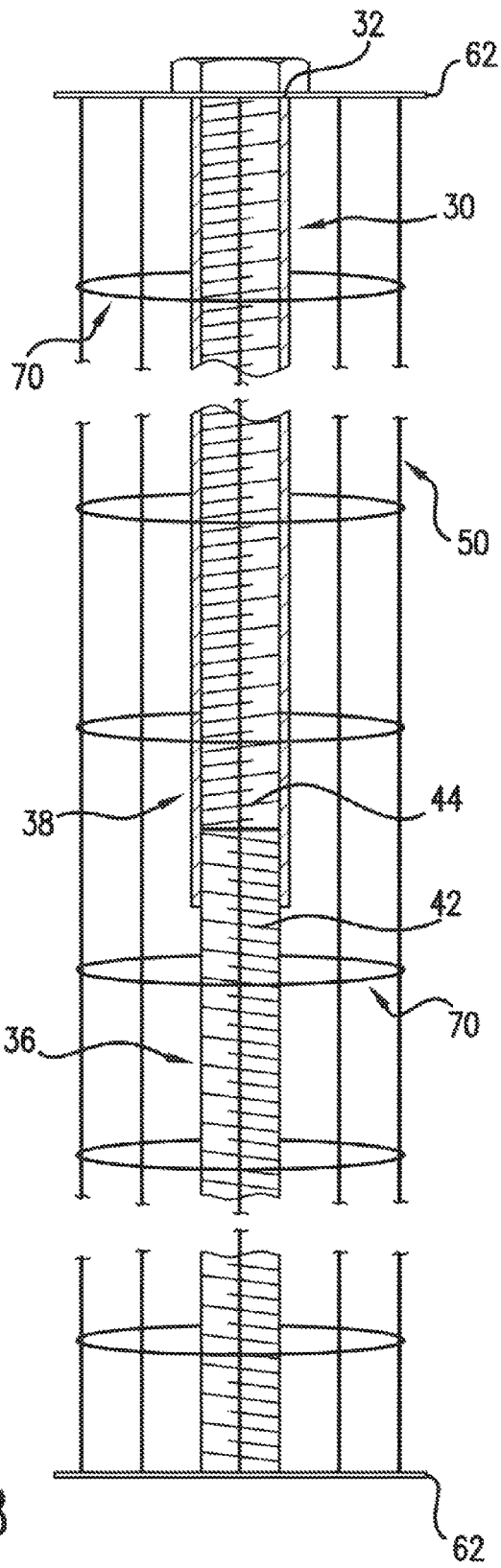
FIG. 7
FIG. 8

HEAT TRANSFER UNIT AND METHOD FOR PREFABRICATED VESSEL

CROSS REFERENCE TO RELATED APPLICATIONS

The present application claims filing benefit as a Continuation-in-Part of U.S. patent application Ser. No. 14/104,681 having a filing date of Dec. 12, 2013 and which is incorporated by reference herein in its entirety.

FEDERAL RESEARCH STATEMENT

This invention was made with Government support under Contract No. DE-AC09-08SR22470, awarded by the U.S. Department of Energy. The Government has certain rights in the invention.

FIELD OF THE INVENTION

The present disclosure is related generally to heat transfer units for use in prefabricated vessels, such as pressure vessels.

BACKGROUND OF THE INVENTION

Vessels for storage of substances such as liquids or gases have been utilized in a variety of industries for a variety of purposes. For example, pressure vessels have been utilized for hydrogen and other gas storage needs. In particular, vessels have been utilized in mobile gas storage markets, such as in the automotive industry, heavy machinery industry, and portable generator industry. Stationary gas storage markets have additionally utilized storage vessels for liquid or gas storage needs.

In general, it is desirable to maintain the fluids stored in a vessel at desired temperatures. Thus, heating of the fluids may be required in colder environments, and cooling of the fluids may be required in hotter environments. Presently known heat transfer units for storage vessels generally fall into three groups: large, bulky units around which a vessel must be manufactured; large, sectional units which include various sections, each of which must be individually inserted into the vessel and then assembled therein; and small units which can be inserted into the vessel in preassembled form but do not provide sufficient heat transfer throughout the entire vessel.

Each of these approaches has disadvantages. Large, bulky units require the time and expense of having vessels manufactured around the units, and the vessels must be destroyed to access the units. Large, sectional units require the time and expense of difficult in-vessel assembly. Small units have limited heat transfer capabilities.

Accordingly, improved heat transfer units for vessels, such as prefabricated vessels, are desired in the art. In particular, heat transfer units which can be efficiently inserted into prefabricated vessels, and which provide improved heat transfer capabilities throughout the vessels, would be advantageous.

BRIEF DESCRIPTION OF THE INVENTION

Aspects and advantages of the invention will be set forth in part in the following description, or may be apparent from the description, or may be learned through practice of the invention.

In accordance with one embodiment, the present disclosure is directed to a heat transfer unit for a prefabricated vessel. The heat transfer unit includes a central rod, and a plurality of peripheral rods surrounding the central rod and connected to the central rod. The plurality of peripheral rods are movable between a first collapsed position and a second bowed position, wherein in the second bowed position a midpoint of each of the plurality of peripheral rods is spaced from the central rod relative to in the first position. The heat transfer unit further includes a heat transfer element connected to one of the plurality of peripheral rods.

In accordance with another embodiment, the present disclosure is directed to a vessel assembly. The vessel assembly includes a prefabricated vessel comprising a shell, the shell defining an interior. The vessel assembly further includes a heat transfer unit insertable into the interior of the prefabricated vessel. The heat transfer unit includes a central rod, and a plurality of peripheral rods surrounding the central rod and connected to the central rod. The plurality of peripheral rods are movable between a first collapsed position and a second bowed position, wherein in the second bowed position a midpoint of each of the plurality of peripheral rods is spaced from the central rod relative to in the first position. The heat transfer unit further includes a heat transfer element connected to one of the plurality of peripheral rods.

In accordance with another embodiment, the present disclosure is directed to a heat transfer unit for a prefabricated vessel. The heat transfer unit includes a central rod extending along and defining a longitudinal axis, and a plurality of peripheral rods surrounding the central rod and connected to the central rod. The plurality of peripheral rods are movable between a first collapsed position and a second bowed position, wherein in the second bowed position a midpoint of each of the plurality of peripheral rods is spaced from the central rod relative to in the first position and each of the plurality of peripheral rods extends helically about the longitudinal axis. The heat transfer unit further includes a heat transfer element connected to one of the plurality of peripheral rods.

In accordance with another embodiment, the present disclosure is directed to a vessel assembly. The vessel assembly includes a prefabricated vessel comprising a shell, the shell defining an interior. The vessel assembly further includes a heat transfer unit insertable into the interior of the prefabricated vessel. The heat transfer unit includes a central rod extending along and defining a longitudinal axis, and a plurality of peripheral rods surrounding the central rod and connected to the central rod. The plurality of peripheral rods are movable between a first collapsed position and a second bowed position, wherein in the second bowed position a midpoint of each of the plurality of peripheral rods is spaced from the central rod relative to in the first position and each of the plurality of peripheral rods extends helically about the longitudinal axis. The heat transfer unit further includes a heat transfer element connected to one of the plurality of peripheral rods.

In accordance with another embodiment, the present disclosure is directed to a heat transfer unit for a prefabricated vessel. The heat transfer unit includes a central rod extending along and defining a longitudinal axis, the central rod including a male portion and a female portion, at least a portion of the male portion insertable into the female portion, wherein the male portion includes an outer thread and the female portion includes a mating inner thread, and wherein twisting of one of the male portion or the female portion relative to the other of the male portion or the female portion inserts the male portion into the female portion. The heat transfer unit further includes a plurality of peripheral rods surrounding the central rod and connected to the central rod, the plurality of peripheral rods movable between a first collapsed position and a second bowed position, wherein insertion of the male portion into the female portion causes movement of the plurality of peripheral rods from the first collapsed position to the second bowed position, and wherein in the second bowed position a midpoint of each of the plurality of peripheral rods is spaced from the central rod relative to in the first position. The heat transfer unit further includes a heat transfer element connected to one of the plurality of peripheral rods.

In accordance with another embodiment, the present disclosure is directed to a vessel assembly. The vessel assembly includes a prefabricated vessel comprising a shell, the shell defining an interior. The vessel assembly further includes a heat transfer unit insertable into the interior of the prefabricated vessel. The heat transfer unit includes a central rod extending along and defining a longitudinal axis, the central rod including a male portion and a female portion, at least a portion of the male portion insertable into the female portion, wherein the male portion includes an outer thread and the female portion includes a mating inner thread, and wherein twisting of one of the male portion or the female portion relative to the other of the male portion or the female portion inserts the male portion into the female portion. The heat transfer unit further includes a plurality of peripheral rods surrounding the central rod and connected to the central rod, the plurality of peripheral rods movable between a first collapsed position and a second bowed position, wherein insertion of the male portion into the female portion causes movement of the plurality of peripheral rods from the first collapsed position to the second bowed position, and wherein in the second bowed position a midpoint of each of the plurality of peripheral rods is spaced from the central rod relative to in the first position. The heat transfer unit further includes a heat transfer element connected to one of the plurality of peripheral rods.

In another embodiment, the present disclosure is directed to a method for facilitating heat transfer in a prefabricated vessel. The method includes inserting a heat transfer unit into the prefabricated vessel, the heat transfer unit including a central rod, a plurality of peripheral rods surrounding the central rod, and a heat transfer element. The method further includes deploying the unit from a first collapsed position to a second bowed position, wherein in the second bowed position a midpoint of each of the plurality of peripheral rods is spaced from the central rod relative to in the first position. The method further includes activating the heat transfer element.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 provides a top sectional view of the heat transfer unit fully inserted into the prefabricated vessel of FIG. 5;

FIG. 8 provides a close-up view of various components of a heat transfer unit in accordance with one embodiment of the present disclosure;

DETAILED DESCRIPTION OF THE INVENTION

Figure 1:
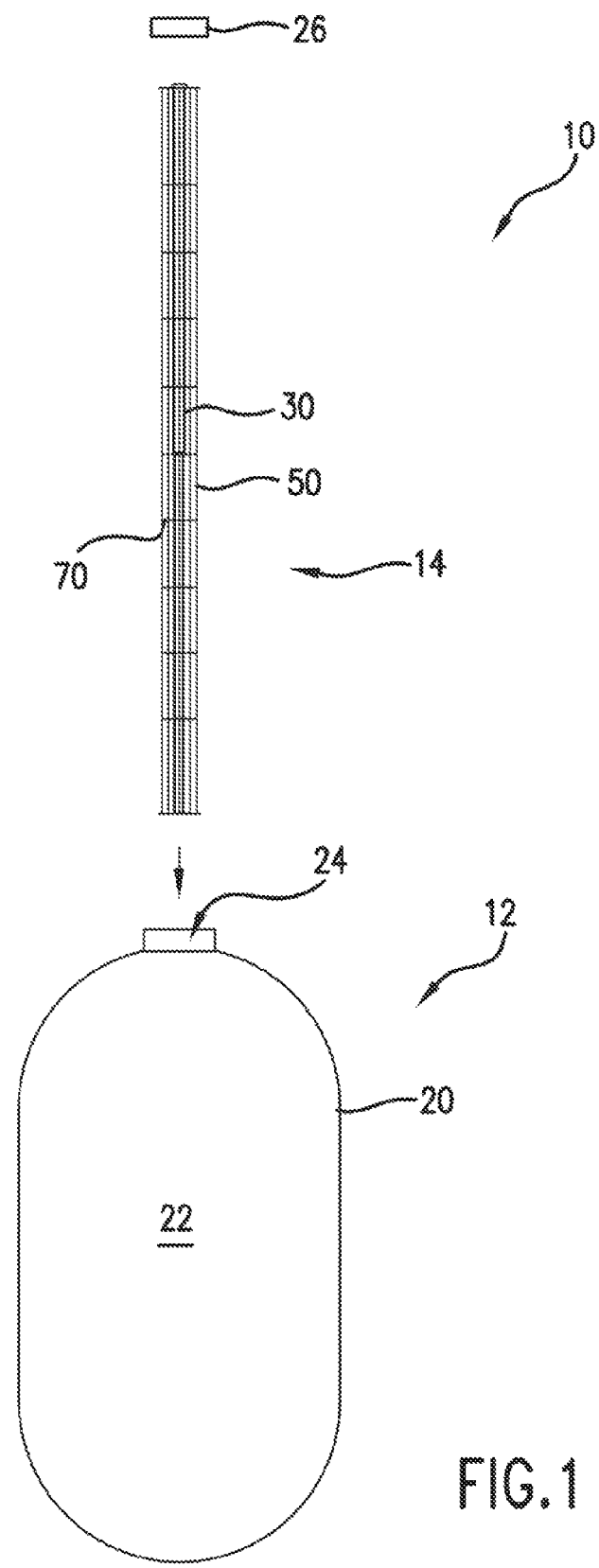
FIG. 1 provides a front sectional view of a heat transfer unit in a first collapsed position before inserting into a prefabricated vessel in accordance with one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to heat transfer units for use in prefabricated vessels. The heat transfer units advantageously expand and contract between collapsed positions and bowed positions. In the collapsed position, a heat transfer unit can be inserted into a prefabricated vessel. In a bowed position, the heat transfer unit can be expanded within the prefabricated vessel, such that heat transfer elements of the heat transfer unit provide improved heat transfer capabilities within the prefabricated vessel. Heat transfer elements, and thus the heat transfer unit generally, can heat and/or cool fluid contained within the prefabricated vessel. For example, in exemplary embodiments, the heat transfer elements in the bowed position are provided generally throughout the interior of the prefabricated vessel, and thus provide improved heat transfer in the prefabricated vessel. Such heat transfer units thus advantageously provide improved heat transfer capabilities while also being efficient to install in prefabricated vessels and not requiring destruction of the prefabricated vessels to access the heat transfer units.

Referring now to FIGS. 1 through 8 and 15-17, various embodiments of a vessel assembly 10 in various positions are illustrated. Vessel assembly 10 may include a prefabricated vessel 12 and a heat transfer unit 14. A prefabricated vessel 10 is generally a vessel 12 constructed independently of a heat transfer unit 14, and which may be utilized to store a fluid, such as a gas or liquid. In some exemplary embodiments, a vessel 10 may be pressure vessel 10, designed to contain a fluid at a pressure above atmospheric. A vessel 12 may include, for example, a shell 20 generally defining an interior 22 of the vessel 12. An opening 24 may further be defined by the shell 20 for accessing the interior 22. Vessel 12 may further include, for example, a cap 26 which may fit into opening 24 to close and/or generally seal the interior 22 of the vessel 12.

Heat transfer unit 14 may be insertable into the interior 22 of vessel 12 through opening 24, and may generally include various expandable and contractable features as well as heat transfer features for generally heating and/or cooling the interior 22 and fluid contained therein as desired. For example, heat transfer unit 14 may include a central rod 30 extending between a first end 32 and a second end 34. The central rod 30 generally has any suitable cross-sectional shape, such as circular, oval, or otherwise, and is sized such that, when the heat transfer unit 14 is in a second bowed position as discussed below, the central rod 30 fits entirely within the vessel 12.

Referring briefly to FIG. 8, in exemplary embodiments, the central rod 30 includes a male portion 36 and a female portion 38. The female portion 38 is generally hollow, such that at least a portion of the male portion 36 is insertable into the female portion 38. Such insertion may facilitate movement of the central rod 30 and heat transfer unit 14 in general between a first collapsed position and a second bowed position. For example, in the first collapsed position, a portion of the male portion 36 may be disposed within the female portion 38. In the second bowed position, a greater portion than in the first position of the male portion 36 may be disposed within the female portion 38. The male portion 36 is thus inserted into the female portion 38 during movement from the first position to the second position. Thus, the central rod 30 may be telescopic, with the male portion 36 being inserted into and withdrawn from the female portion 38 as required for movement between the first and second positions.

In further exemplary embodiments, the male portion 36 may include an outer thread 42 and the female portion 38 may include a mating inner thread 44. The threads 42, 44 may mate together, such that twisting of the male and/or female portion in one direction, such as about a longitudinal axis 31, causes the male portion 36 to be inserted into the female portion 38, while twisting in an opposite direction, such as about the longitudinal axis 31, causes the male portion 36 to be withdrawn from the female portion 38.

Referring again to FIGS. 1 through 7 and 15-17, a heat transfer unit 14 according to the present disclosure further includes a plurality of peripheral rods 50. The peripheral rods 50 generally surround the central rod 30, as shown, and are connected to the central rod 30. For example, each rod 50 may extend between a first end 52 and a second end 54. Each rod 50 further generally has any suitable cross-sectional shape, such as circular, oval, or otherwise, and is sized such that, when the heat transfer unit 14 is in a second bowed position as discussed below, the rods 50 fit entirely within the vessel 12. The first and second ends 52, 54 may be connected to the central rod 30. For example, the first ends 52 may be connected to the female portion 38, and the second ends 54 may be connected to the male portion 36. In some embodiments, the first ends 52 and second ends 54 may be directly, and in exemplary embodiments fixedly, connected (such as via a suitable adhesive, mechanical fastener, etc.) to the central rod 30 (such as the female and male portions 38, 36 thereof). Alternatively, first and second plates 60, 62 may be disposed between and may connect the first ends 52 and second ends 54 to the central rod 30 (such as the female and male portions 38, 36 thereof). For example, plates 60, 62 may be provided, to which the first and second ends 52, 54 may be connected. The plates 60, 62 may further be connected to the central rod 30 (such as to the female and male portions 38, 36, respectively), which may facilitate the connection of the rods 50 to the central rod 30. Plates 60, 62 and/or rods 50 may in some embodiments further be rotatable about the central rod 30 (and a longitudinal axis 31 thereof) as required to facilitate movement of the central rod 30, such as the male and female portions 36, 38 thereof, between the first and second positions. Alternatively, plate 60, 62 may be fixidly connected to the central rod 30, and may thus move (such as rotate about longitudinal axis 31) with the central rod 30, such as the male and female portions 36, 38 thereof, during movement thereof between the first and second positions.

Rods 50 may generally further define midpoints 56 between the first and second ends 52, 54 thereof. Advantageously, during movement of the heat transfer unit 14 between a first position and a second position, the midpoints 56 may move inwards and outwards relative to the central rod 30 to expand the overall area of the heat transfer unit 14.

Figure 2:
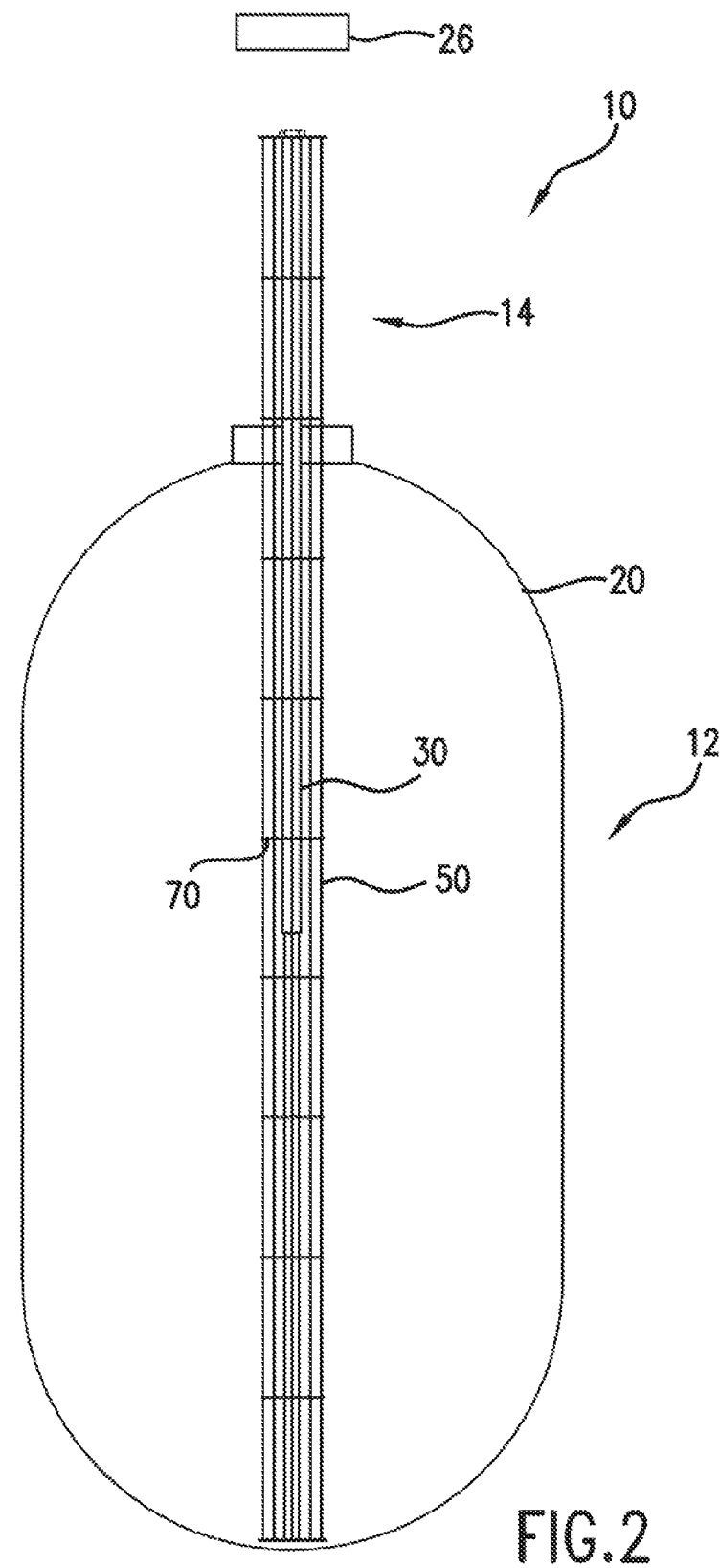
FIG. 2 provides a front sectional view of a heat transfer unit in a first collapsed position partially inserted into a prefabricated vessel in accordance with one embodiment of the present disclosure.
Figure 3:
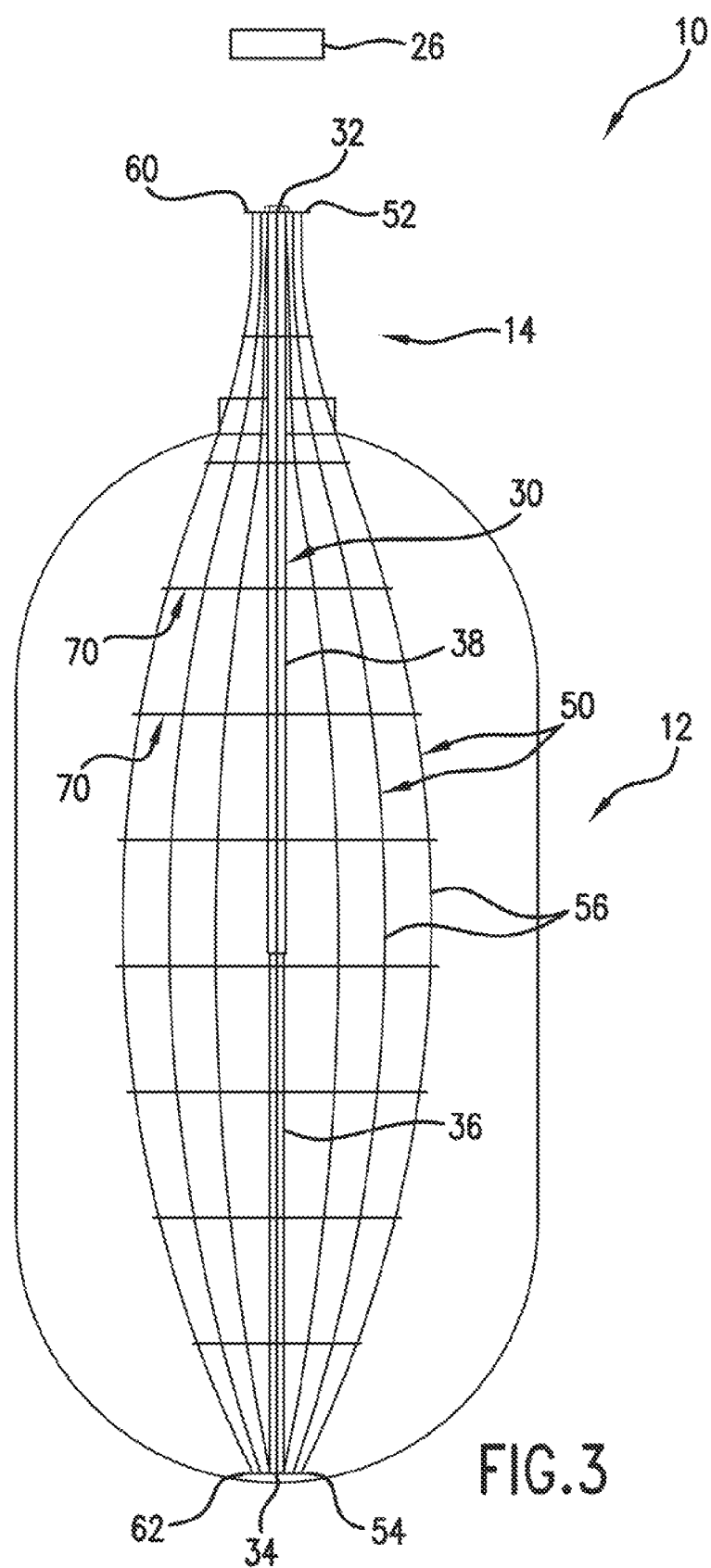
FIG. 3 provides a front sectional view of a heat transfer unit between a first collapsed position and a second bowed position partially inserted into a prefabricated vessel in accordance with one embodiment of the present disclosure.
Figure 4:
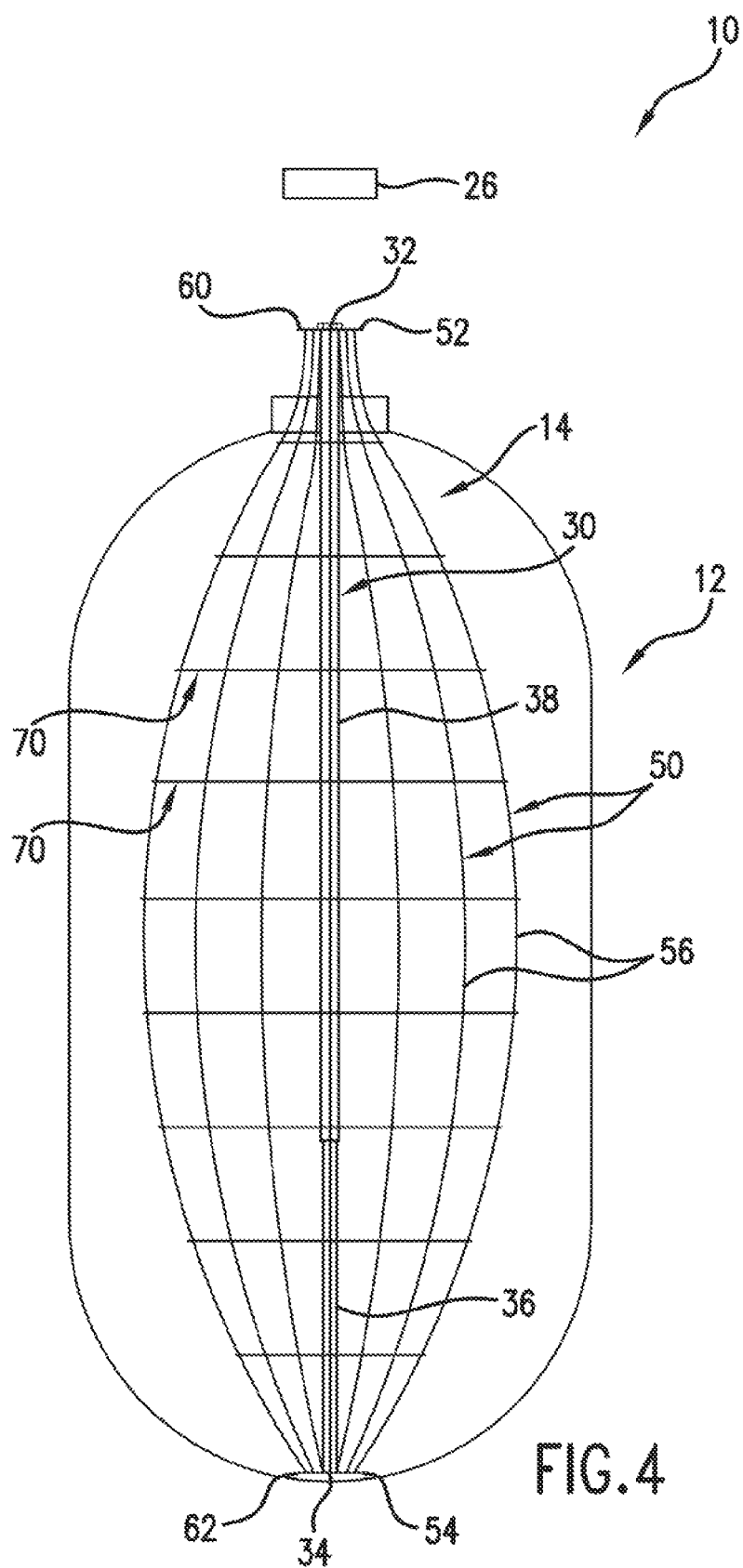
FIG. 4 provides a front sectional view of a heat transfer unit between a first collapsed position and a second bowed position further inserted into a prefabricated vessel in accordance with one embodiment of the present disclosure.
Figure 5:
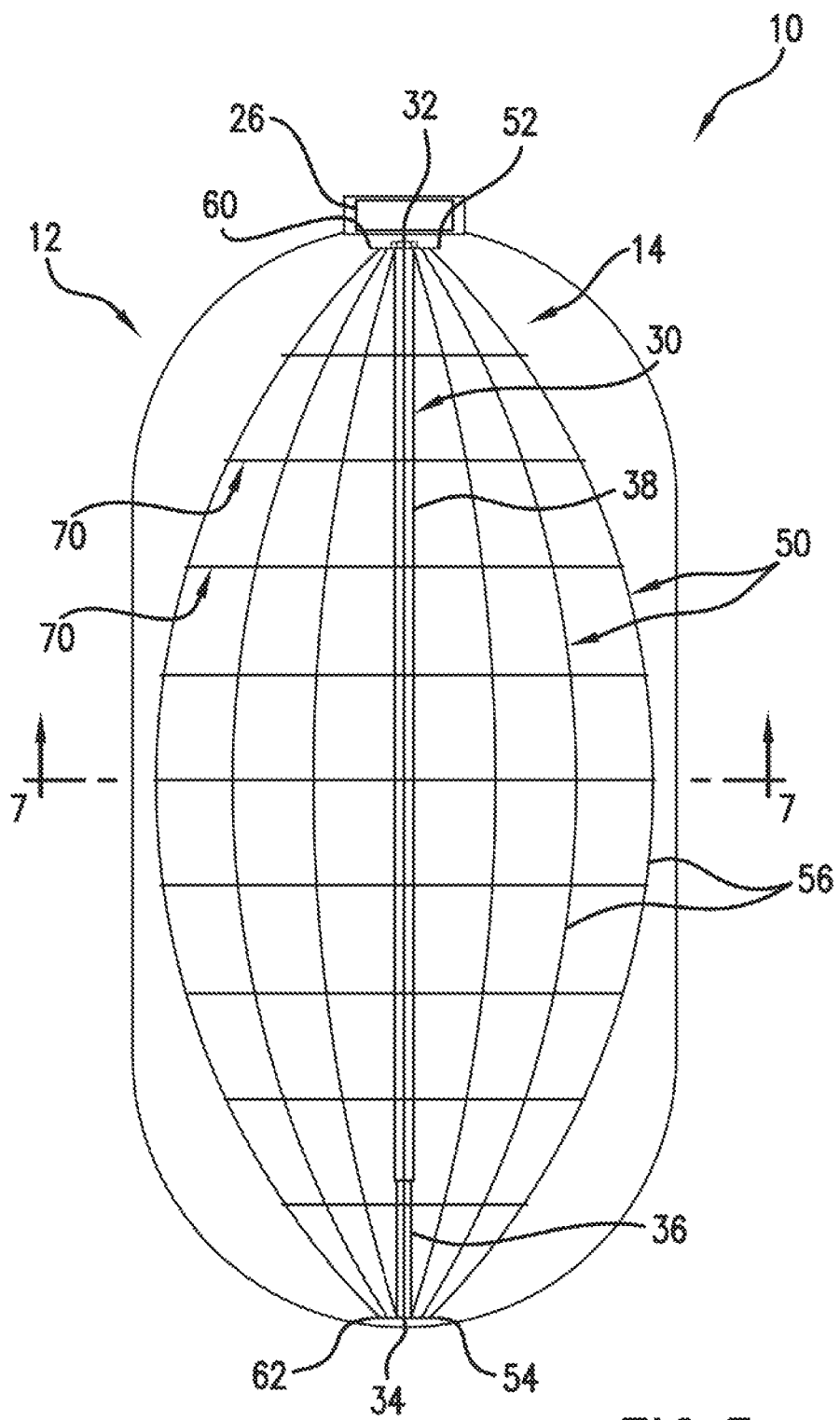
FIG. 5 provides a front sectional view of a heat transfer unit in a second bowed position fully inserted into a prefabricated vessel in accordance with one embodiment of the present disclosure.
Figure 6:
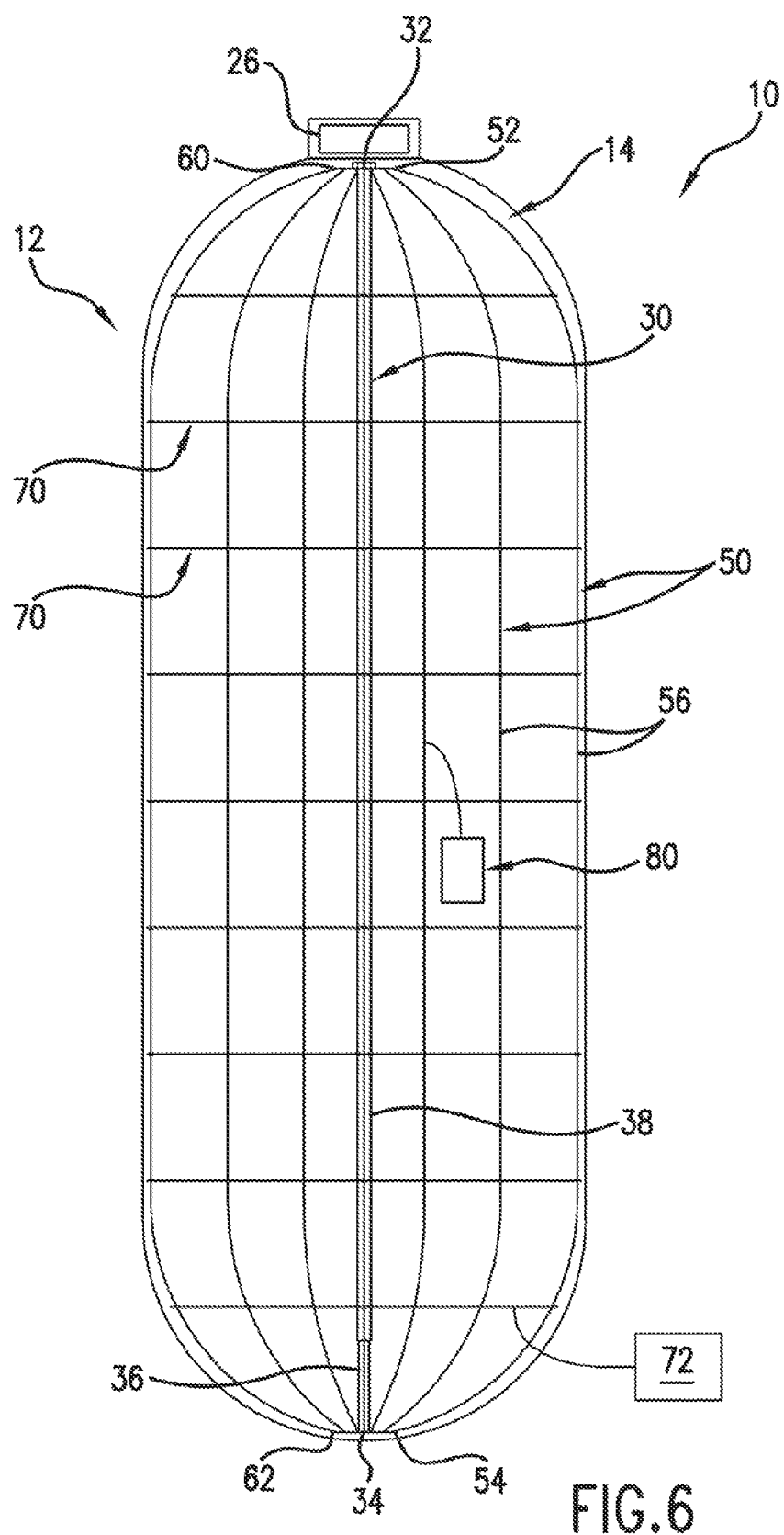
FIG. 6 provides a front sectional view of a heat transfer unit in a second bowed position fully inserted into a prefabricated vessel in accordance with another embodiment of the present disclosure.
Figure 15:
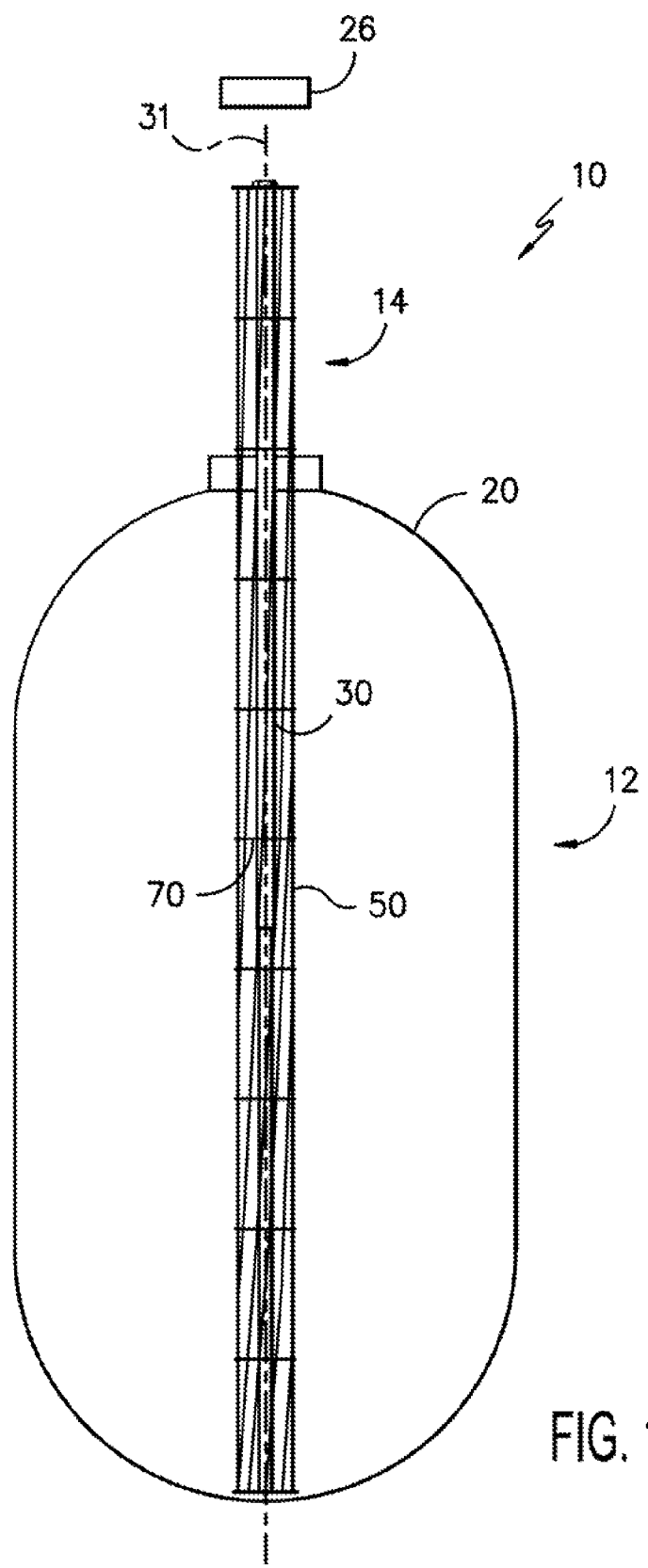
FIG. 15 provides a front sectional view of a heat transfer unit in a first collapsed position partially inserted into a prefabricated vessel in accordance with another embodiment of the present disclosure.
Figure 16:
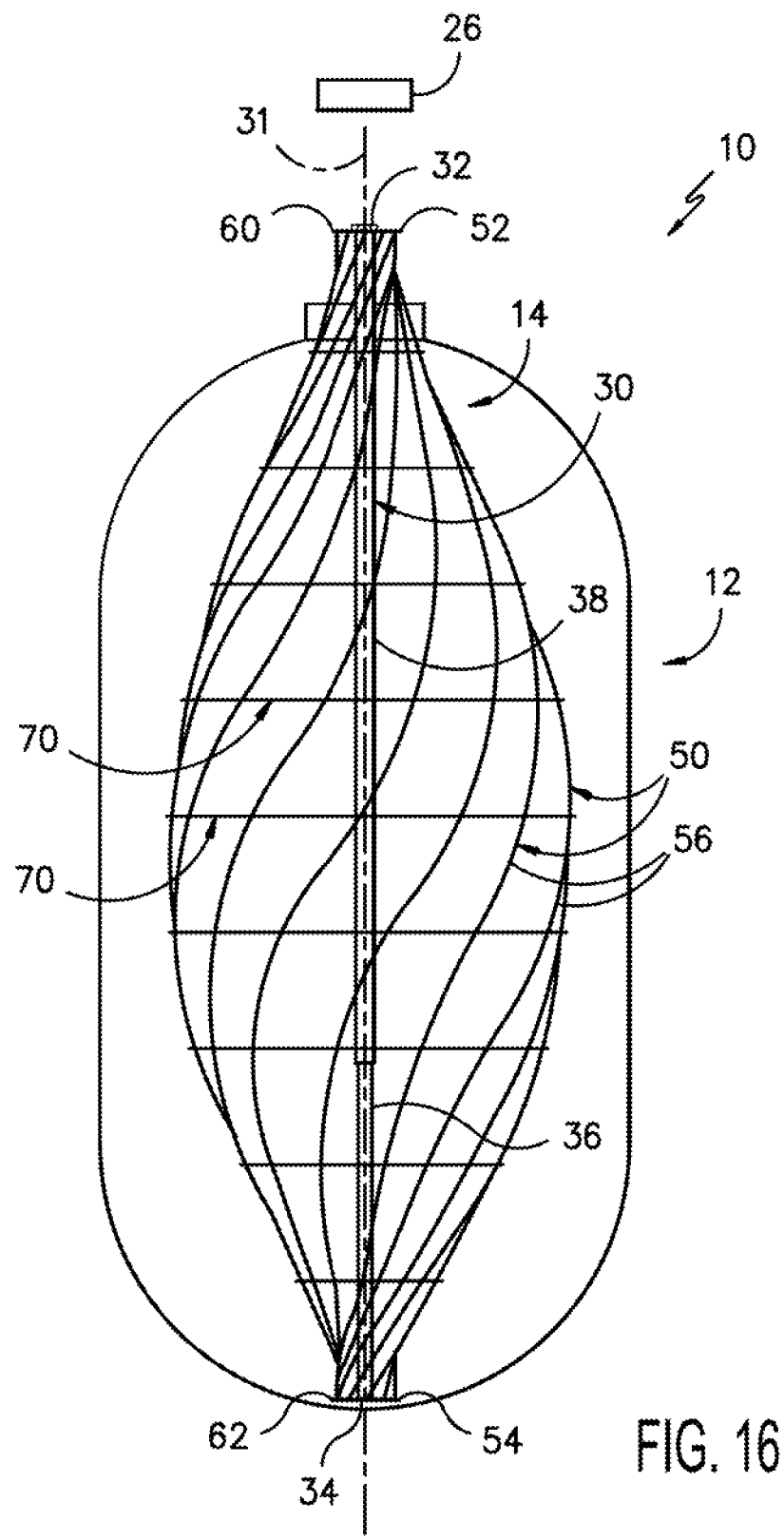
FIG. 16 provides a front sectional view of a heat transfer unit between a first collapsed position and a second bowed position further inserted into a prefabricated vessel in accordance with another embodiment of the present disclosure.
Figure 17:
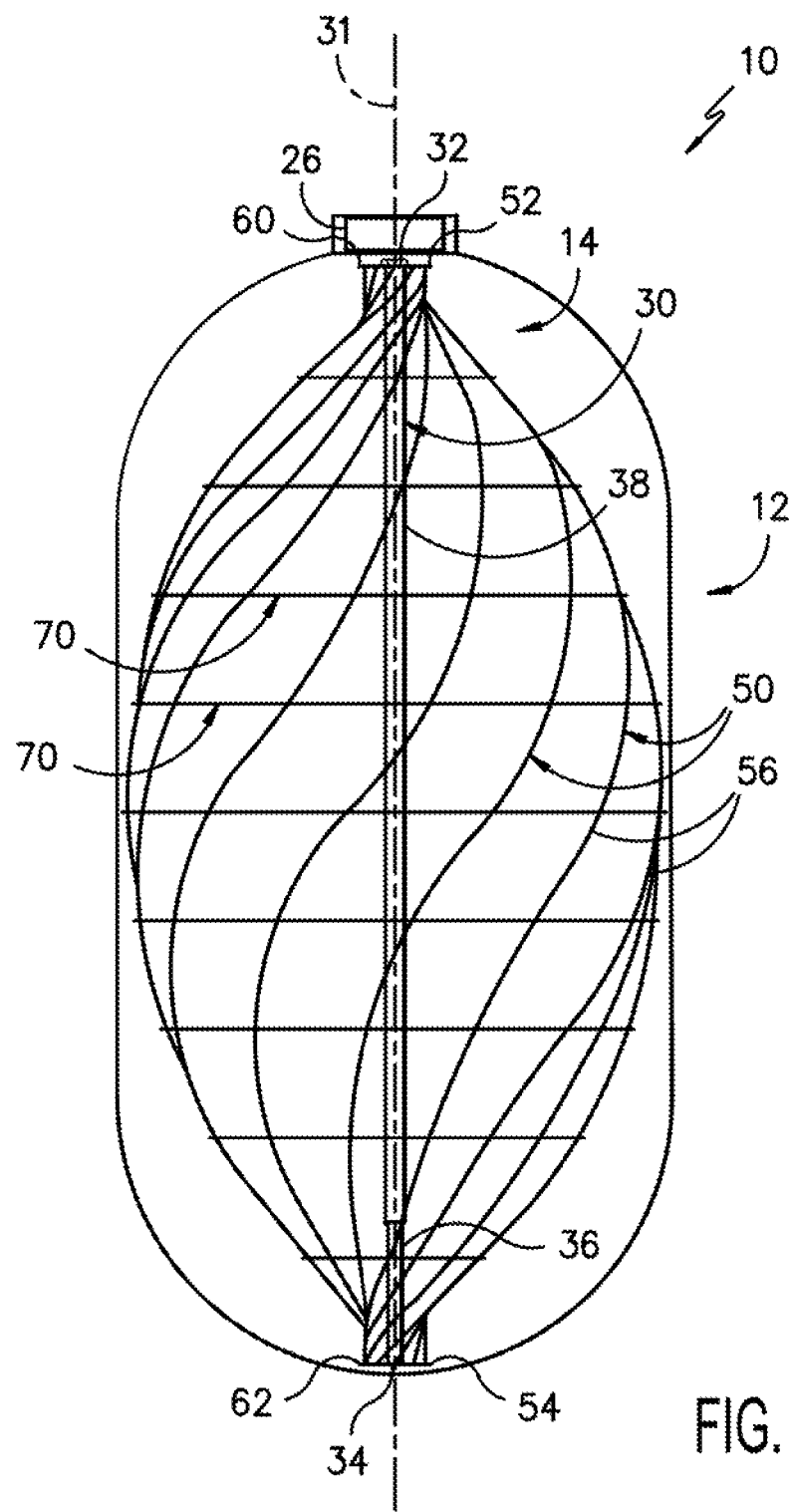
FIG. 17 provides a front sectional view of a heat transfer unit in a second bowed position fully inserted into a prefabricated vessel in accordance with another embodiment of the present disclosure.

For example, as discussed, the peripheral rods 50 are movable between a first collapsed position and a second bowed position. FIGS. 1, 2 and 15 illustrate the peripheral rods 50 in the first collapsed position, wherein the midpoints 56 are generally proximate the central rod 30 and the rods 50 may, for example, be approximately parallel to the central rod 30. In the collapsed position, the heat transfer unit 14 can be inserted into the vessel 12, as illustrated in FIGS. 2 and 15. FIGS. 3, 4 and 16 illustrate the peripheral rods 50 in various stages between the first collapsed position and a second bowed position, wherein the midpoints 56 are becoming increasingly spaced from the central rod 30 relative to the locations when in the first position. FIGS. 5, 6 and 17 illustrate the peripheral rods 50 in various embodiments in the second bowed position. In these embodiments, the peripheral rods 50 are generally bowed outwards, with the midpoints 56 of the rods 50 spaced from the central rod 30 relative to in the first position. In some embodiments, as illustrated in FIGS. 5 and 17, the rods 50 may be curvilinear generally throughout their lengths when in the second bowed position, while in other embodiments, as illustrated in FIG. 6, the rods 50 may include curvilinear portion(s) and linear portion(s). Rods 50 may generally be bowed outwardly in the second bowed position such that the heat transfer unit 14 generally takes up a substantial area of the vessel interior 22 relative to when in the first position. In some embodiments, rods 50 may contact the shell 20, such as the interior wall thereof. In other embodiments, rods 50 may be spaced from and not in contact with the shell 20. Further, in some embodiments, various rods 50 may contact the shell 50, while others may be spaced from and not in contact with the shell 20.

As illustrated, central rod 30 may extend along and define a longitudinal axis 31. In some embodiments, as illustrated in FIGS. 1 through 8, the rods 50 may extend generally linearly along the longitudinal axis 31 between the first ends 52 and second ends 54 thereof. Such linear orientation may occur when in the first position and/or in the second position, as shown. Alternatively, in some embodiments as illustrated in FIGS. 15 through 17, the rods 50 may extend generally helically along the longitudinal axis 31 between the first ends 52 and second ends 54 thereof. Such helical orientation may occur when in the first position and/or in the second position, as shown. Notably, the helical orientation in the second position may be caused in some embodiments by twisting of the female portion 38 and/or male portion 36 relative to the other and about the longitudinal axis 31. The resulting rotation of the first ends 52 relative to the second ends 54 and/or second ends 54 relative to the first ends 52 may rotate the rods 50 into helical orientations. Such rotation of the first ends 52 and/or second ends 54 may result from the ends 52, 54 being directly and fixidly connected to the central rod 30 (such as the female portion 38 and male portion 36, respectively) or connected (i.e. fixidly) to the plates 60, 62 which in turn are fixidly connected to the central rod 30 (such as the female portion 38 and male portion 36, respectively). These connections may result in rotation of the ends 52, 54 due to rotation of the female portion 38 and/or male portion 36.

Peripheral rods 50 may be biased towards the first collapsed position or the second bowed position. For example, in some embodiments, the peripheral rods 50 may be in tension when in the first collapsed position. In these embodiments, rods 50 are biased towards the second bowed position, and may for example return to the second bowed position when not under the influence of any external biasing force. When moving from the first position to the second position, the tension in these rods 50 may thus be reduced. In other embodiments, the peripheral rods 50 may be in compression when in the second bowed position. In these embodiments, rods 50 are biased towards the first collapsed position, and may for example return to the first collapsed position when not under the influence of any external biasing force. When moving from the first position to the second position, the compressive force on these rods 50 may thus be increased.

Referring now to FIGS. 1 through 17, one or more heat transfer elements 70 may be included in heat transfer unit 14, each of which may be connected to one or more of the peripheral rods 50. For example, as illustrated, a heat transfer element 70 may extend from a peripheral rod 50. In some embodiments, a heat transfer element 70 may extend between the peripheral rod 50 and the central rod 30. In other embodiments, a heat transfer element 70 may extend between the peripheral rod 50 and another one of the peripheral rods 50. In other embodiments, a heat transfer element 70 may extent at one end from a peripheral rod 50 with an opposing end not attached to another component of the heat transfer unit 14.

Figure 9:
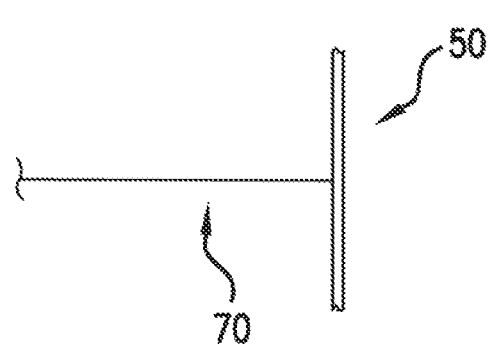
FIGS. 9 through 14 provide side views of various connections of heat transfer elements to a peripheral rod of a heat transfer unit in accordance with various embodiments of the present disclosure.
Figure 10:
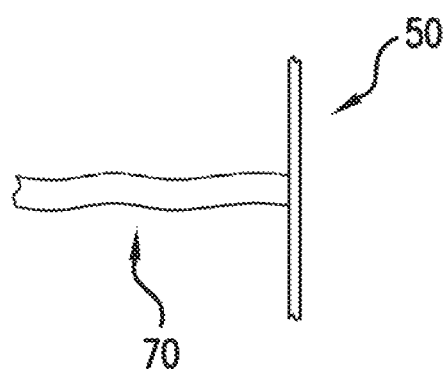
Figure 11:
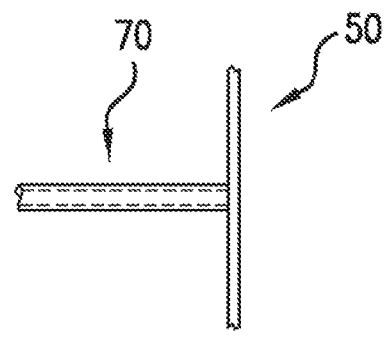
Figure 12:
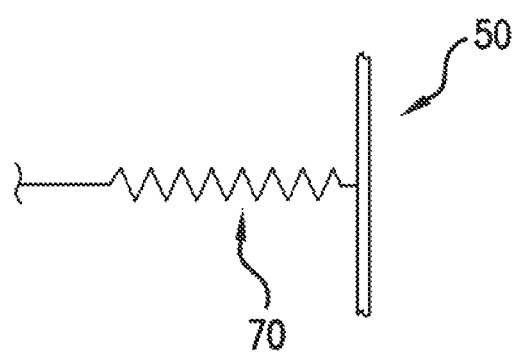

Referring now to FIGS. 9 through 14, various embodiments of a heat transfer element 70 and a connection of a heat transfer element 70 to a rod, such as a peripheral rod 50 as shown or a central rod 30, are illustrated. For example, in some embodiments, a heat transfer element 70 may include a wire, as illustrated in FIG. 9, such as a flexible wire or a rigid wire. In other embodiments, a heat transfer element 70 may include a ribbon, as illustrated in FIG. 10. In other embodiments, a heat transfer element 70 may be a tube, as shown in FIG. 11, through which a heating or cooling fluid may be flowed. In still other embodiments, a heat transfer element 70 may comprises a coiled wire, as illustrated in FIG. 12, or other suitable spring-like component. It should be understood that heat transfer element 70 may generally be formed from or include any suitable electrically and/or thermally conductive material, such that the heat transfer elements may generate heat as desired when activated. It should additionally be understood that heat transfer elements 70 may be connected to a power source 72 (see FIG. 6), which may be internal or external to the vessel 12 and which may selectively activate the heat transfer elements 70 as required.

Figure 13:
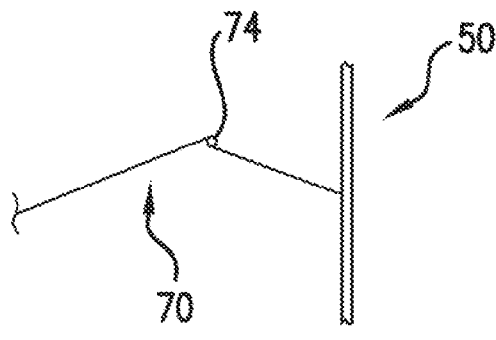
Figure 14:
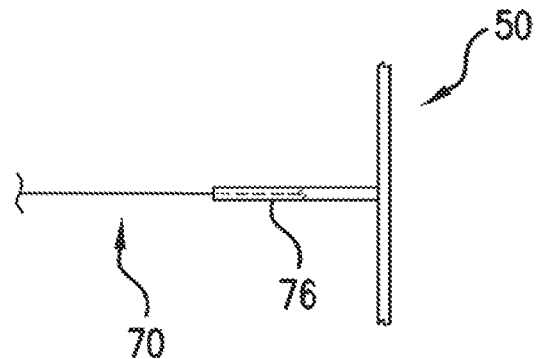

FIGS. 13 and 14 illustrate various embodiments of connections between a heat transfer element 70 and a rod, such as a peripheral rod 50 or central rod 30. In some embodiments, a hinge 74 may connect a heat transfer element 70 to a rod, as illustrated in FIG. 13. In other embodiments, a sleeve 76 may connect a heat transfer element 70 to a rod. In some embodiment, such sleeve 76 may surround and be movable with respect to the rod, with a heat transfer element 70 fixidly connected to the sleeve 76. In another embodiment, as illustrated in FIG. 14, such sleeve 76 may be fixidly connected to the rod, with a portion of the heat transfer element 70 inserted into and movable within the sleeve 76. It should further be understood that any suitable connection between a heat transfer element 70 and a rod, such as a peripheral rod 50 or central rod 30, is within the scope and spirit of the present disclosure.

Referring briefly to FIG. 6, in some embodiments, a heat transfer unit 14 may further include one or more auxiliary devices 80 coupled to one or more rods, such as peripheral rods 50 or central rod 30, or coupled to one or more heat transfer elements 70. An auxiliary device 80 may be utilized to, for example measure various characteristics of the fluid within the vessel 12, take samples of the fluid, etc. For example, an auxiliary device 80 may be a sensor, such as a chemical sensor; a sampling device, such as a pitot tube; a thermocouple; or a pressure transducer.

It should additionally be noted that, in some exemplary embodiments, the central rod 30 and/or one or more peripheral rods 50 may have heat exchange capabilities, and may provide heat to the vessel interior 22. For example, such rods 30, 50 may be formed from or include any suitable electrically and/or thermally conductive material, such that the rods 30, 50 may generate heat as desired when activated. Rods 30, 50 may, whether configured for heat transfer capabilities or not, be formed from any suitable materials, including in exemplary embodiments composites such as carbon fiber composites or other suitable flexible materials.

The present disclosure is further directed to methods for facilitating heat transfer in a prefabricated vessel 12. A method may include, for example, the step of inserting a heat transfer unit 14 into the prefabricated vessel 12, as discussed above. A method may further include, for example, deploying the unit 14 from a first collapsed position to a second bowed position. A method may further include, for example, activating one or more heat transfer elements 70 of the unit 14, such as by turning on or connecting the heat transfer elements 70 to a power source 72.

In some embodiments, the deploying step may include, for example, de-tensioning the plurality of peripheral rods 50, as discussed above. In other embodiments, the deploying step may include, for example, compressing the plurality of peripheral rods 50, as discussed above.

Further, in some embodiments, the deploying step may include, for example, inserting a male portion 36 of a central rod 30 into a female portion 38 of the central rod 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat transfer unit for a prefabricated vessel, the heat transfer unit comprising:
   a central rod extending along and defining a longitudinal axis;
   a plurality of peripheral rods surrounding the central rod and connected to the central rod, the plurality of peripheral rods movable between a first collapsed position and a second bowed position, wherein in the second bowed position a midpoint of each of the plurality of peripheral rods is spaced from the central rod relative to in the first position and each of the plurality of peripheral rods extends helically about the longitudinal axis, and wherein each of the plurality of peripheral rods is biased towards the second position when in the first position such that each of the plurality of rods returns to the second position when not under the influence of an external biasing force or wherein each of the plurality of peripheral rods is biased towards the first position when in the second position such that each of the plurality of rods returns to the first position when not under the influence of an external biasing force; and
   a heat transfer element connected to one of the plurality of peripheral rods.

2. The heat transfer unit of claim 1, wherein in the first collapsed position each of the plurality of peripheral rods extends helically about the longitudinal axis.

3. The heat transfer unit of claim 1, wherein the central rod comprises a male portion and a female portion, at least a portion of the male portion insertable into the female portion.

4. The heat transfer unit of claim 3, wherein the male portion is inserted into the female portion as the plurality of peripheral rods are moved from the first collapsed position to the second bowed position.

5. The heat transfer unit of claim 3, wherein the male portion comprises an outer thread and the female portion comprises a mating inner thread, and wherein twisting of one of the male portion or the female portion relative to the other of the male portion or the female portion inserts the male portion into the female portion.

6. The heat transfer unit of claim 1, further comprising a first plate disposed between and connecting first ends of each of the plurality of rods and the central rod and a second plate disposed between and connecting second ends of each of the plurality of rods and the central rod, the first and second plates fixedly connected to the central rod.

7. The heat transfer unit of claim 1, wherein the plurality of peripheral rods are in tension when in the first collapsed position.

8. The heat transfer unit of claim 1, wherein the plurality of peripheral rods are in compression when in the second bowed position.

9. The heat transfer unit of claim 1, wherein the heat transfer element is a plurality of heat transfer elements.

10. The heat transfer unit of claim 1, wherein the heat transfer element extends between and is connected to the one of the plurality of peripheral rods and one of the central rod or another one of the plurality of peripheral rods.

11. The heat transfer unit of claim 1, further comprising a hinge connecting the heat transfer element to the peripheral rod.

12. The heat transfer unit of claim 1, further comprising a sleeve connecting the heat transfer element to the peripheral rod.

13. The heat transfer unit of claim 1, further comprising an auxiliary device coupled to one of the plurality of peripheral rods.

14. A heat transfer unit for a prefabricated vessel, the heat transfer unit comprising:
   a central rod extending along and defining a longitudinal axis, the central rod comprising a male portion and a female portion, at least a portion of the male portion insertable into the female portion, wherein the male portion comprises an outer thread and the female portion comprises a mating inner thread, and wherein twisting of one of the male portion or the female portion relative to the other of the male portion or the female portion inserts the male portion into the female portion;
   a plurality of peripheral rods surrounding the central rod and connected to the central rod, the plurality of peripheral rods movable between a first collapsed position and a second bowed position, wherein insertion of the male portion into the female portion causes movement of the plurality of peripheral rods from the first collapsed position to the second bowed position, and wherein in the second bowed position a midpoint of each of the plurality of peripheral rods is spaced from the central rod relative to in the first position, and wherein each of the plurality of peripheral rods is biased towards the second position when in the first position such that each of the plurality of rods returns to the second position when not under the influence of an external biasing force or wherein each of the plurality of peripheral rods is biased towards the first position when in the second position such that each of the plurality of rods returns to the first position when not under the influence of an external biasing force;
   a heat transfer element connected to one of the plurality of peripheral rods.

15. The heat transfer unit of claim 14, wherein in the second bowed position each of the plurality of peripheral rods extends helically about the longitudinal axis.

16. The heat transfer unit of claim 14, wherein in the first collapsed position each of the plurality of peripheral rods extends helically about the longitudinal axis.

17. The heat transfer unit of claim 14, further comprising a first plate disposed between and connecting first ends of each of the plurality of rods and the central rod and a second plate disposed between and connecting second ends of each of the plurality of rods and the central rod, the first and second plates each fixedly connected to the central rod.

18. The heat transfer unit of claim 14, further comprising an auxiliary device coupled to one of the plurality of peripheral rods.

19. A vessel assembly, comprising:
- a prefabricated vessel comprising a shell, the shell defining an interior; and
- a heat transfer unit insertable into the interior of the prefabricated vessel, the heat transfer unit comprising:
  - a central rod extending along and defining a longitudinal axis;
  - a plurality of peripheral rods surrounding the central rod and connected to the central rod, the plurality of peripheral rods movable between a first collapsed position and a second bowed position, wherein in the second bowed position a midpoint of each of the plurality of peripheral rods is spaced from the central rod relative to in the first position and each of the plurality of peripheral rods extends helically about the longitudinal axis, and wherein each of the plurality of peripheral rods is biased towards the second position when in the first position such that each of the plurality of rods returns to the second position when not under the influence of an external biasing force or wherein each of the plurality of peripheral rods is biased towards the first position when in the second position such that each of the plurality of rods returns to the first position when not under the influence of an external biasing force; and
  - a heat transfer element connected to one of the plurality of peripheral rods.

20. The vessel assembly of claim 19, wherein in the first collapsed position each of the plurality of peripheral rods extends helically about the longitudinal axis.

\* \* \* \* \*